(12) United States Patent
Hsieh et al.

(10) Patent No.: US 8,274,601 B2
(45) Date of Patent: Sep. 25, 2012

(54) DIGITAL CAMERA

(75) Inventors: Ming-Chih Hsieh, Taipei Hsien (TW); Tsung-Hsi Li, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 330 days.

(21) Appl. No.: 12/817,202

(22) Filed: Jun. 17, 2010

(65) Prior Publication Data
US 2011/0242408 A1 Oct. 6, 2011

(30) Foreign Application Priority Data
Mar. 30, 2010 (TW) ................ 99109745 A

(51) Int. Cl.
*H04N 5/225* (2006.01)
(52) U.S. Cl. ........................ 348/375; 348/335

(58) Field of Classification Search .......... 348/373–376, 348/335; 396/71, 72
See application file for complete search history.

(56) References Cited

U.S. PATENT DOCUMENTS

| | | | |
|---|---|---|---|
| 5,739,853 A * | 4/1998 | Takahashi | 348/335 |
| 7,307,663 B2 * | 12/2007 | Pokrovsky et al. | 348/373 |
| 2010/0149408 A1 * | 6/2010 | Ito et al. | 348/374 |

* cited by examiner

*Primary Examiner* — Tuan Ho
(74) *Attorney, Agent, or Firm* — Altis Law Group, Inc.

(57) ABSTRACT

A digital camera includes a bezel and an extending ring. The bezel includes a convex ring and at least one fixing portion. The convex ring is positioned on a center of the bezel. The fixing portion is defined on an outer sidewall of the convex ring. The extending ring includes a sleeve, a flange, and at least one fastening portion. The sleeve is placed around the outer sidewall of the convex ring. The flange extends from an end of the sleeve and abuts the convex ring. The fastening portion cooperates with the fixing portion.

7 Claims, 5 Drawing Sheets

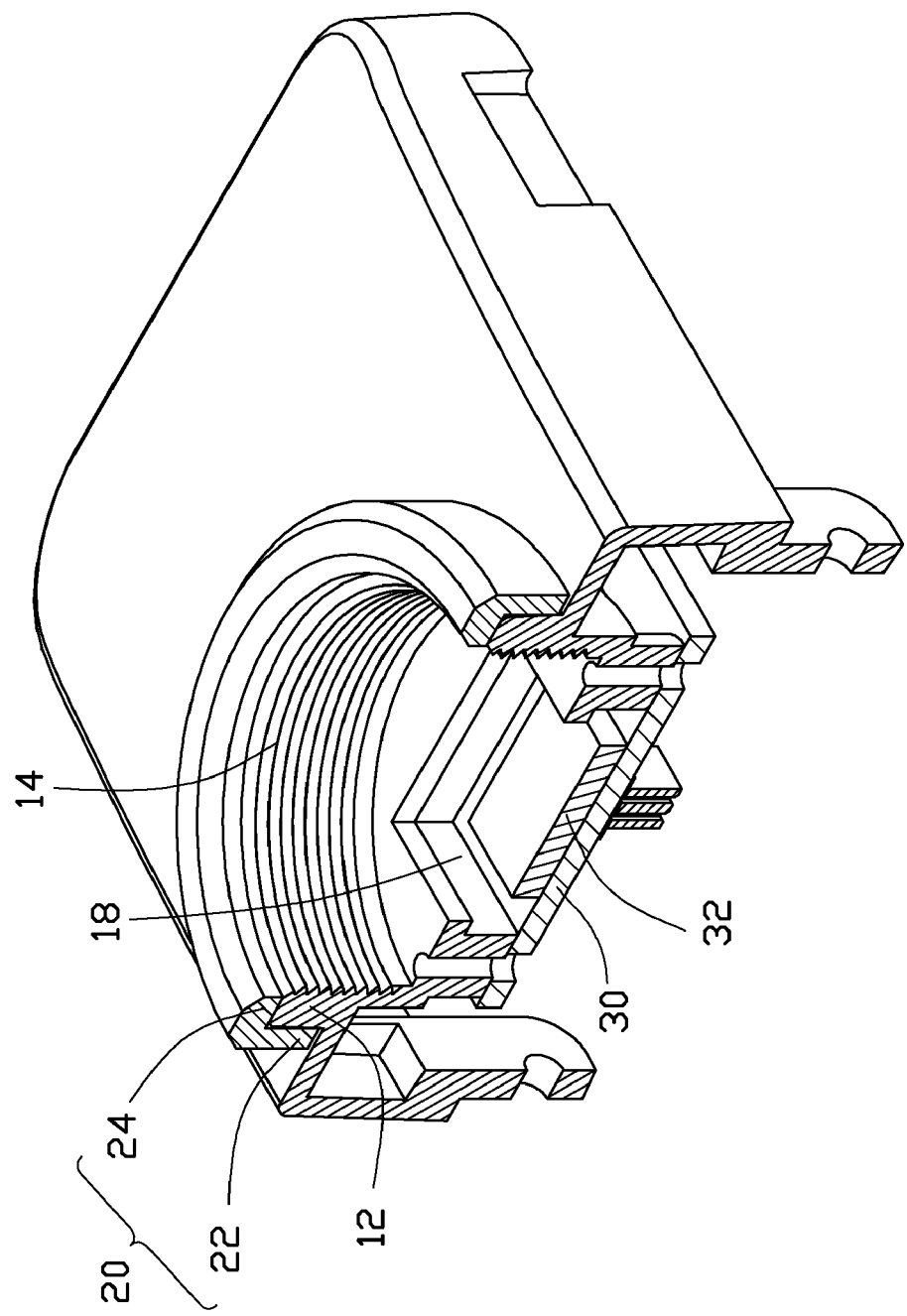

DIGITAL CAMERA

BACKGROUND

1. Technical Field

The present disclosure relates to digital cameras and, particularly, to a digital camera having an extending ring.

2. Description of Related Art

While portable electronic devices with camera function have become extremely popular, lack of a focusing function in many limits their ability to fully perform as a functional camera. An image sensor of the digital camera device may be a CCD image sensor or a CMOS image sensor, and thickness of the CCD image sensor often exceeds the thickness of the CMOS image sensor. However, as thicknesses of the image sensors vary, different bezels of the digital camera are required for mating a back focal length of a digital camera with the lens. The requirement for varied bezels make the manufacturing process unduly cumbersome.

Therefore, an extending ring of a digital camera is desired to overcome the limitations described.

BRIEF DESCRIPTION OF THE DRAWINGS

Many aspects of the present device can be better understood with reference to the following drawings. The components in the drawings are not necessarily drawn to scale, the emphasis instead being placed upon clearly illustrating the principles of the present digital camera. Moreover, in the drawings, like reference numerals designate corresponding parts throughout the several views.

FIG. 5 is a cutaway view of the digital camera of FIG. 4, taken along line V-V thereof.

DETAILED DESCRIPTION

Figure 1:
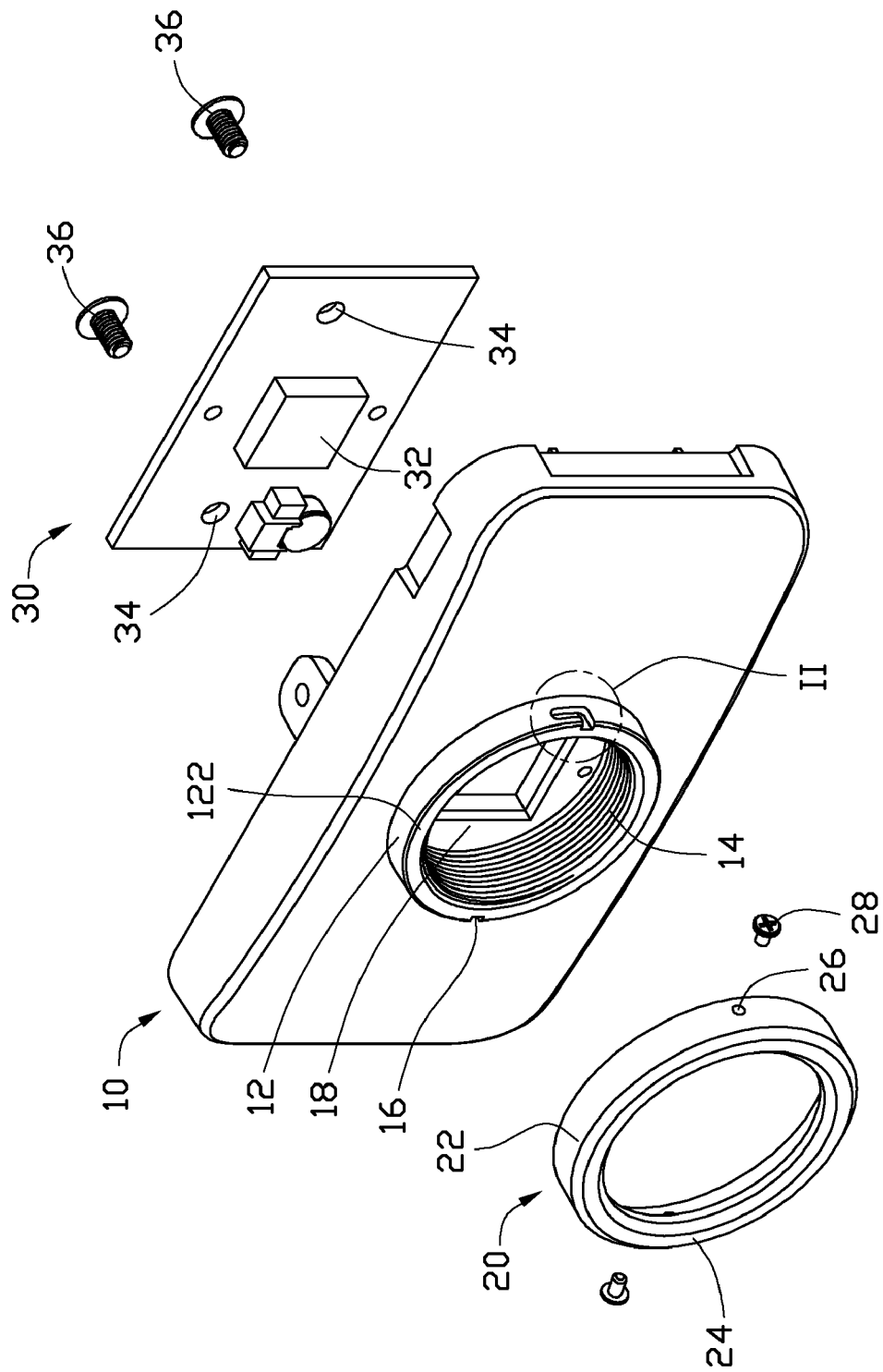
FIG. 1 is an exploded, isometric view of a digital camera according to an exemplary embodiment.
Figure 2:
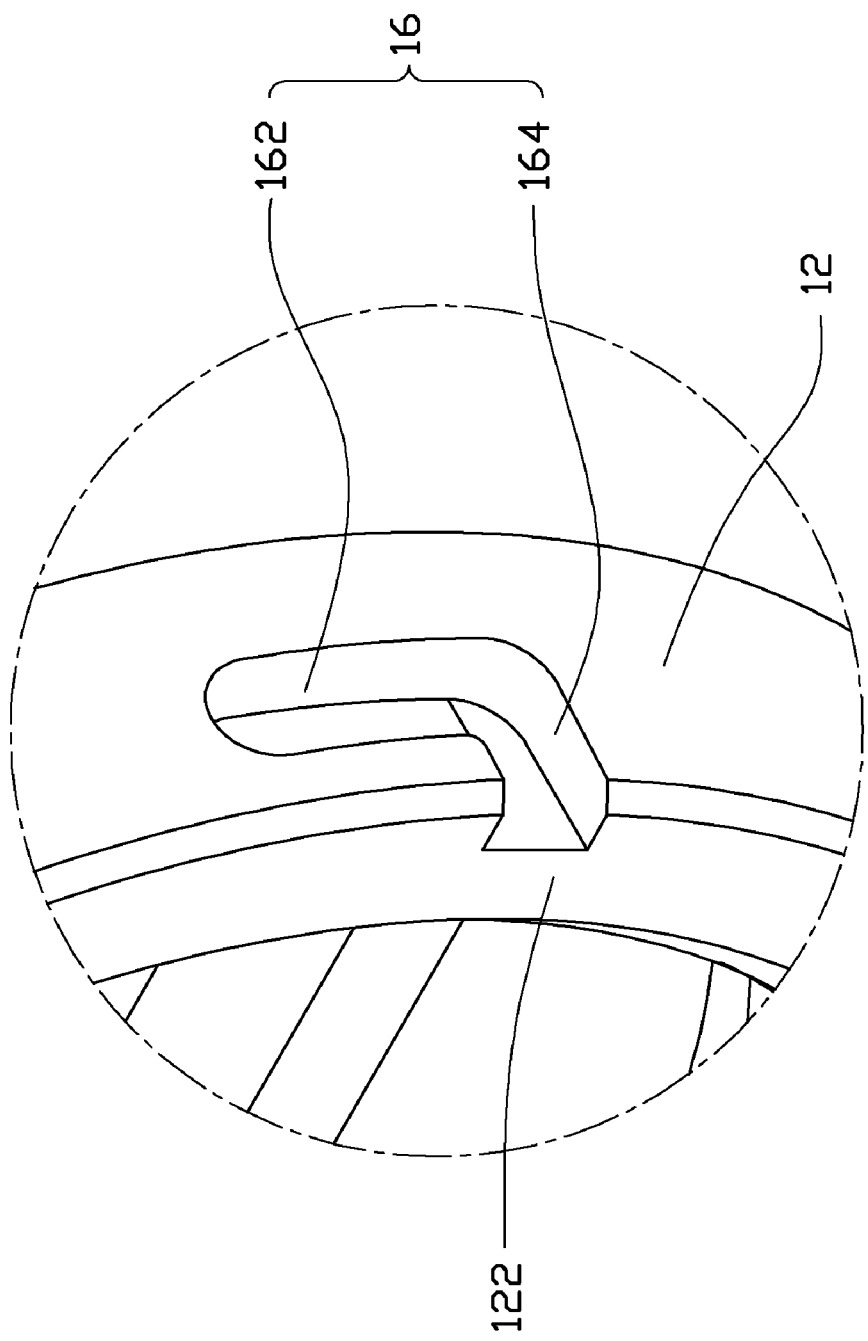
FIG. 2 is an enlarged view of encircled portion II of FIG. 1.
Figure 3:
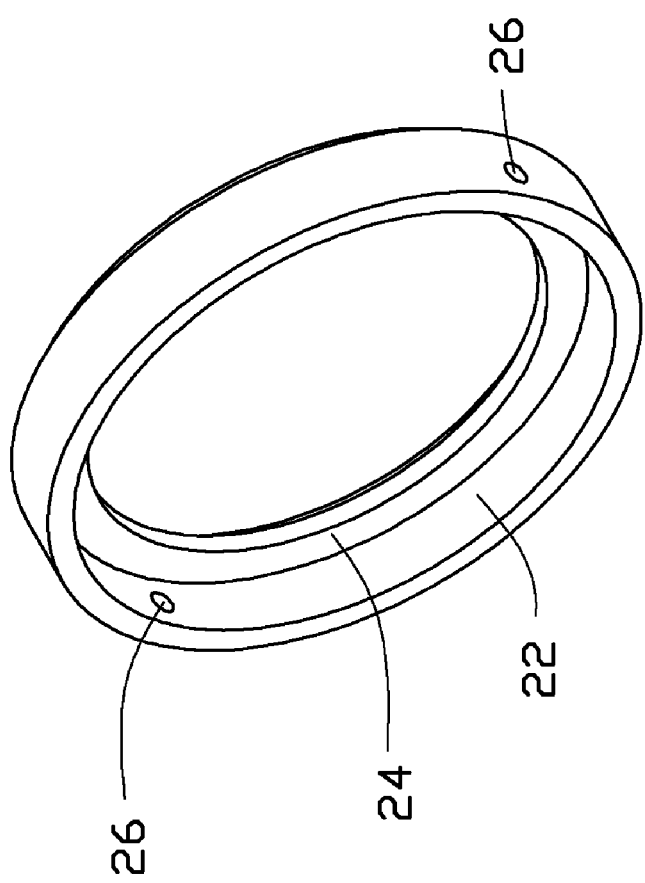
FIG. 3 is an enlarged view of an extending ring of FIG. 1, but viewed from another aspect.

Referring to FIGS. 1-3, a digital camera, according to an exemplary embodiment, is shown. The digital camera includes a bezel 10, an extending ring 20, and a circuit board 30. Other technical components well known in the fields related to the invention are not described in detail.

A center of the bezel 10 includes a convex ring 12. An outer sidewall of the convex ring 12 defines a fixing portion. In the illustrated embodiment, the fixing portion is a pair of L-shaped recesses 16, situated opposite to each other across the ring 12. An inner sidewall of the convex ring 12 defines a threaded hole 14 for receiving a lens (not shown) therein. The L-shaped recesses 16 include a first portion 162 and a second portion 164. The first portion 162 is substantially parallel to an end surface 122 of the convex ring 12. The second portion 164 is substantially perpendicular to the end surface 122 of the convex ring 12. The depth of the L-shaped recesses 16 is less than the thickness of convex ring 12. The bezel 10 defines a square hole 18 corresponding to the convex ring 12.

The extending ring 20 includes a sleeve 22, a flange 24, and a fastening portion. The flange 24 extends inwards from an end of the sleeve 22, forming an annular ring. The fastening portion cooperates with the fixing portion. In the illustrated embodiment, the fastening portion is a pair of threaded holes 26. The threaded holes 26 are positioned opposite to each other and to the L-shaped recesses 16. The inner diameter of the sleeve 22 exceeds the outer diameter of the convex ring 12. The inner diameter of the flange 24 exceeds or equals the inner diameter of the convex ring 12. The outer diameter of the flange 24 is less than the outer diameter of the sleeve 22. The thickness of the flange 24 equals a difference value of thicknesses between a CCD image sensor and a CMOS image sensor. The distance between the threaded holes 26 and flange 24 equals the distance between the end surface 122 and the first portion 162.

The circuit board 30 includes an image sensor 32. The image sensor 32 maybe a CCD image sensor or a CMOS image sensor. The image sensor 32 faces and is substantially aligned with the lens. The circuit board 30 defines two through holes 34 therein.

Figure 4:
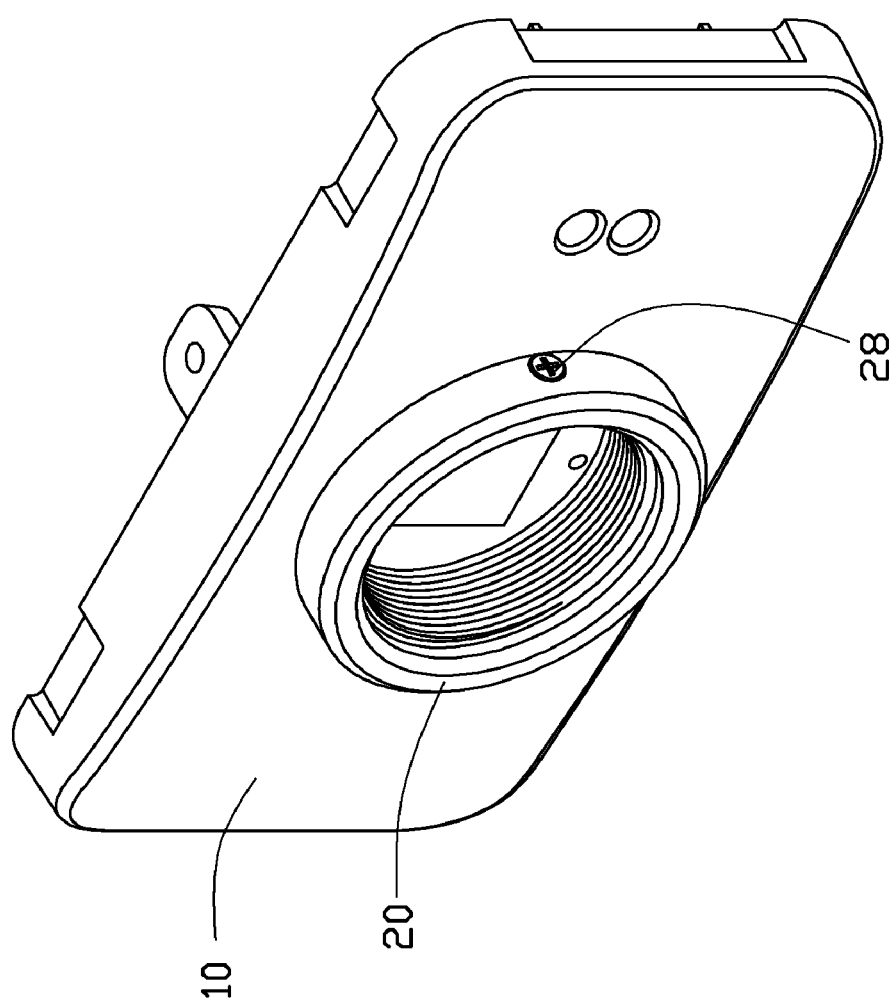
FIG. 4 is an assembled, isometric view of the digital camera of FIG. 1.

Referring to FIGS. 4-5, when the image sensor 32 is a CCD image sensor, the bezel 10 and the extending ring 20 can be secured to each other by fasteners 28 each running through one threaded hole 26. The length of the fasteners 28 exceeds the thickness of the sleeve 22. A portion of the fasteners 28 protrude from the sleeve 22 aligning with the second portion 164 of the L-shaped recesses 16 and sliding into the L-shaped recesses. Thus the sleeve 22 is placed around the outer sidewall of the convex ring 12, the flange 24 abuts the end surface 122 of the convex ring 12. The extending ring 20 can be fixed on the convex ring 12 by rotating the extending ring 20 along an extending direction of the first portion 162. The circuit board 30 and the bezel 10 can be secured to each other by fasteners 36 each running through one through hole 34 and a threaded hole (not shown) of the bezel 10. The image sensor 32 of the circuit board 30 is substantially aligned with the square hole 18 of the bezel 10. Finally, the lens and the bezel 10 can be secured to each other through the threaded hole 14 of the convex ring 12, adjusting a distance between the lens and the image sensor 32 by the extending ring 20 for mating a back focal length of a digital camera with the lens. When the image sensor 32 is a CMOS image sensor, the extending ring 20 can be removed. The circuit board 30 and the bezel 10 can be secured to each other by fasteners 36 each running through one through hole 34 and a threaded hole (not shown) of the bezel 10. The image sensor 32 of the circuit board 30 is substantially aligned with the square hole 18 of the bezel 10. Finally, the lens and the bezel 10 can be secured to each other through the threaded hole 14 of the convex ring 12.

While the invention has been described by way of example and in terms of preferred embodiment, it is to be understood that the invention is not limited thereto. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A digital camera, comprising:
    a bezel comprising a convex ring and at least one fixing portion, wherein the convex ring is positioned on the bezel, and wherein the fixing portion is defined on an outer sidewall of the convex ring; and
    an extending ring comprising a sleeve, a flange, and at least one fastening portion, wherein the sleeve is placed around the outer sidewall of the convex ring, wherein the flange extends from an end of the sleeve and abuts the convex ring, and wherein the at least one fastening portion cooperates with the at least one fixing portion to mount the extending ring to the convex ring.

2. The digital camera of claim 1, wherein the number of the at least one fixing portion is at least two, and each fixing portion defines a recess; and wherein the number of the at least one fastening portion corresponds to the number of the at least one fixing portion, and each fastening portion comprises a threaded hole corresponding to the recess of one of the fixing portions for mounting the extending ring to the convex ring by fastening means.

3. The digital camera of claim 2, wherein each recess is L-shaped, and wherein the depth of the recess is less than a thickness of the convex ring.

4. The digital camera of claim 3, wherein each recess comprises a first portion and a second portion, and wherein the first portion is parallel to an end surface of the convex ring, and wherein the second portion is perpendicular to the end surface of the convex ring.

5. The digital camera of claim 4, wherein the distance between the end surface and the first portion equals the distance between the threaded holes and the flange.

6. The digital camera of claim 1, further comprising a circuit board, wherein the circuit board comprises an image sensor, and wherein the image sensor comprises a CCD image sensor or a CMOS image sensor.

7. The digital camera of claim 6, wherein a difference value of thicknesses between the CCD image sensor and the CMOS image sensor equals the thickness of the flange.

* * * * *